(12) United States Patent
Ye et al.

(10) Patent No.: US 11,761,658 B2
(45) Date of Patent: Sep. 19, 2023

(54) METHOD, DEVICE AND SYSTEM FOR NETWORKING AIR CONDITIONING UNITS, STORAGE MEDIUM, AND PROCESSOR

(71) Applicant: Gree Electric Appliances, Inc. of Zhuhai, Guangdong (CN)

(72) Inventors: Tieying Ye, Guangdong (CN); Jie Tang, Guangdong (CN); Weiyou Yu, Guangdong (CN); Wencan Wang, Guangdong (CN); Du Yang, Guangdong (CN); Zhongwen Deng, Guangdong (CN); Qiang Huang, Guangdong (CN); Yang Zhang, Guangdong (CN); Cuiming Ma, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 513 days.

(21) Appl. No.: 16/976,925

(22) PCT Filed: Dec. 11, 2018

(86) PCT No.: PCT/CN2018/120357
§ 371 (c)(1),
(2) Date: Aug. 31, 2020

(87) PCT Pub. No.: WO2019/165818
PCT Pub. Date: Sep. 6, 2019

(65) Prior Publication Data
US 2021/0041126 A1 Feb. 11, 2021

(30) Foreign Application Priority Data
Mar. 2, 2018 (CN) .......................... 201810176112.0

(51) Int. Cl.
*F24F 11/58* (2018.01)
*F24F 11/49* (2018.01)
(Continued)

(52) U.S. Cl.
CPC .............. *F24F 11/58* (2018.01); *F24F 11/49* (2018.01); *H04W 12/04* (2013.01); *H04W 76/15* (2018.02)

(58) Field of Classification Search
CPC ........... F24F 11/58; F24F 11/49; H04W 76/15
See application file for complete search history.

(56) References Cited

U.S. PATENT DOCUMENTS

| | | | |
|---|---|---|---|
| 7,451,480 B2 | 11/2008 | Yamamoto | |
| 2009/0113544 A1* | 4/2009 | Chancey | ................. G06F 21/31 726/19 |

(Continued)

FOREIGN PATENT DOCUMENTS

| | | |
|---|---|---|
| CN | 103186115 A | 7/2013 |
| CN | 104613591 A | 5/2015 |

(Continued)

OTHER PUBLICATIONS

Translation of CN104968028A (Year: 2015).*

*Primary Examiner* — Mohammad Ali
*Assistant Examiner* — Vincent W Chang
(74) *Attorney, Agent, or Firm* — The Webb Law Firm

(57) ABSTRACT

A method, a device and a system for networking air conditioning units, a storage medium, and a processor. The method includes: determining a wireless network for networking an air conditioning unit of the air conditioning unit, and an identification of the wireless network; and controlling the air conditioning unit to network according to the wireless network and the identification.

20 Claims, 4 Drawing Sheets

(51) Int. Cl.
*H04W 76/15* (2018.01)
*H04W 12/04* (2021.01)

(56) References Cited

U.S. PATENT DOCUMENTS

| | | | |
|---|---|---|---|
| 2011/0058536 A1 | 3/2011 | Tsuchiya et al. | |
| 2012/0265861 A1 | 10/2012 | Yang et al. | |
| 2013/0091548 A1* | 4/2013 | Song | H04W 12/50 726/4 |
| 2014/0052774 A1* | 2/2014 | Pollack | H04W 52/0241 709/224 |
| 2014/0254390 A1* | 9/2014 | Ansley | H04W 24/06 370/241 |
| 2015/0181432 A1* | 6/2015 | Casu | H04W 12/50 726/4 |
| 2016/0209060 A1 | 7/2016 | Castillo et al. | |
| 2016/0211985 A1* | 7/2016 | Castillo | G05B 15/02 |
| 2017/0364106 A1* | 12/2017 | Smith | G05D 23/306 |
| 2018/0132167 A1* | 5/2018 | Zhang | H04W 48/17 |
| 2018/0324226 A1* | 11/2018 | Lu | G05B 13/024 |
| 2018/0363936 A1* | 12/2018 | Inoue | F24F 11/61 |

FOREIGN PATENT DOCUMENTS

| | | | | |
|---|---|---|---|---|
| CN | 104654524 A | | 5/2015 | |
| CN | 104968028 A | | 10/2015 | |
| CN | 105091198 A | | 11/2015 | |
| CN | 106288249 A | | 1/2017 | |
| CN | 108386965 A | * | 8/2018 | F24F 11/58 |
| CN | 108534299 A | | 9/2018 | |
| KR | 20050034413 A | | 4/2005 | |

\* cited by examiner

METHOD, DEVICE AND SYSTEM FOR NETWORKING AIR CONDITIONING UNITS, STORAGE MEDIUM, AND PROCESSOR

CROSS-REFERENCE TO RELATED APPLICATIONS

This application is the United States national phase of International Application No. PCT/CN2018/120357, filed Dec. 11, 2018, and claims priority to Chinese Patent Application No. 201810176112.0, filed Mar. 2, 2018, the disclosures of which are hereby incorporated by reference in their entirety.

BACKGROUND OF THE INVENTION

Field of the Invention

The present disclosure relates to a method, a device and a system for networking air-conditioning units, a storage medium, and a processor.

Description of Related Art

In a multi-split air conditioner, a refrigerant system generally comprises an outdoor unit and a plurality of indoor units. In a refrigerant system, the outdoor unit can communicate with the plurality of indoor units. For a plurality of refrigerant systems, there will be communication chaos between the plurality of refrigerant systems. In the related art known to the inventors, wired communication (such as CAN communication) which can use a communication line to physically divide the network is generally used.

With the popularization of wireless communication, communication lines between air-conditioning systems, and between related outdoor and indoor units are not needed. For example, wireless communication technologies such as Power Line Carrier (PLC) communication or ZigBee is used, but not limited thereto, to realize data interaction, thereby reducing the cost in air-conditioning communication lines and the requirement of engineering wiring.

BRIEF DESCRIPTION OF THE DRAWINGS

The accompanying drawings described herein are used to provide a further understanding of the present disclosure and constitute a part of the present disclosure. The illustrative embodiments of the present disclosure as well as the illustrations thereof, which are used for explaining the present disclosure, do not constitute improper definitions on the present disclosure. In the accompanying drawings.

DESCRIPTION OF THE INVENTION

In order to allow those skilled in the art to better understand the solution of the present disclosure, a clear and complete description of technical solutions of the present disclosure will be given below in combination with specific embodiments of the present disclosure and corresponding drawings. Apparently, the embodiments described below are merely a part, but not all, of the embodiments of the present disclosure. All other embodiments, obtained by those skilled in the art based on the embodiments of the present disclosure without any creative effort, fall into the protection scope of the present disclosure.

It should be noted that the terms "first", "second" or the like in the specification, the claims of the present disclosure and the above accompanying drawings are used to distinguish similar objects and are not necessarily used to describe a specific order or sequence. It should be understood that the terms thus used are interchangeable as appropriate, such that the embodiments of the present disclosure described herein are implemented, in a sequence other than those illustrated or described here. In addition, the terms "comprise" and "has" as well as any of their deformations are intended to cover a non-exclusive inclusion. For example, the process, method, system, product, or device that contains a series of steps or units is not necessarily limited to those steps or units that are explicitly listed, but, in some embodiments, comprises other steps or units that are not explicitly listed or that are inherent to such process, method, product or device.

The inventors have noticed that, after wireless communication (e.g., based on PLC communication) is used to replace wired communication, since the indoors and the outdoor units of all the refrigerant systems in wireless communication are in the same network, there are many communication signals, and a signal received by an outdoor unit is not necessarily transmitted by an indoor unit of the same refrigerant system. Thus, the communication between the indoor and outdoor units of the multi-split air conditioner is unreliable.

According to embodiments of the present disclosure, embodiments of a method for networking air-conditioning units are provided. It should be noted that in some embodiments, the steps shown in the flowchart of the accompanying drawings are performed in a computer system with a set of computer-executable instructions. Moreover, although a logical sequence is shown in the flowchart, in some cases, the steps shown or described are performed in a sequence different from here.

Figure 1:
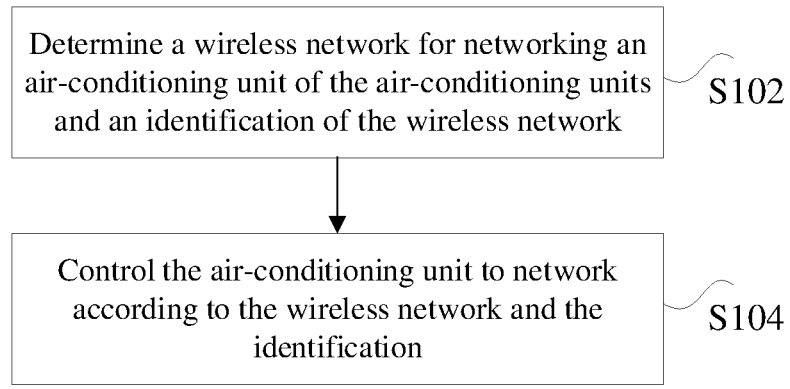
FIG. 1 is a flowchart showing a method for networking air-conditioning units according to embodiments of the present disclosure.

FIG. 1 is a flowchart showing a method for networking air-conditioning units according to embodiments of the present disclosure. As shown in FIG. 1, the method comprises the following steps.

At step S102, a wireless network for networking an air-conditioning unit of the air-conditioning units and an identification of the wireless network are determined.

At step S104, the air-conditioning unit is controlled to network according to the wireless network and the identification.

Through the above steps, for the air-conditioning unit triggering networking, the air-conditioning unit is networked by using a wireless network and the identification of the wireless network. The purpose of accurate communication between air-conditioner units is achieved, thereby realizing the technical effect of effectively avoiding communication between different air-conditioning unit systems and allowing a reliable communication between air-conditioning units within a same air-conditioning unit system. Thus, the technical problem of unreliable communication after wireless communication is used in the related art is further solved.

The identification is a power-on password of the air-conditioning unit in some embodiments, that is, a power-on password for unlocking the air-conditioning unit.

Before the wireless network for networking the air-conditioning unit is determined, in some embodiments, the air-conditioning unit is triggered to enter a networking state according to a variety of trigger information. For example, a networking trigger information for triggering the air-conditioning unit to enter a networking state sent from a debugging device is received and a networking state is entered according to the networking trigger information. The debugging device is configured to debug the networking of the air-conditioning unit.

In some embodiments, the networking trigger information sent from the debugging device may comprise a power-on password for unlocking the air-conditioning unit sent from the debugging device.

The step that the networking state is entered according to the networking trigger information of may comprise: the power-on password sent from the debugging device is compared with the power-on password stored by the air-conditioning unit to determine whether the power-on password sent from the debugging device matches with the power-on password stored by the air-conditioning unit, and the networking state is entered with the power-on password as a network key in a case where the power-on password sent from the debugging device matches with the power-on password stored by the air-conditioning unit.

At least one of the power-on password sent from the debugging device or the power-on password stored by the air-conditioning unit is obtained by reading a power-on information of the air-conditioning unit. The power-on information is stored in at least one of a barcode or a two-dimensional code. It should be noted that the power-on password may be obtained from the power-on information in various manners. For example, the power-on information may be converted correspondingly to the power-on password by a predetermined conversion rule, or the power-on password may be correspondingly obtained by a predetermined correspondence. The power-on information of the air-conditioning unit may comprise unit information for identifying the air-conditioning unit, which may be, for example, parameter information of the air-conditioning unit, or information of other air-conditioning units networking with the air-conditioning unit.

In some embodiments, the wireless network for networking the air-conditioning unit is determined in various manners. For example, at least one wireless network within a predetermined distance of the air-conditioning unit is first obtained; the at least one wireless network is filtered to obtain a unique wireless network within a predetermined range as the wireless network for networking the air-conditioning unit. It should be noted that, in some embodiments, the above predetermined distance depends on the number of other air-conditioning units networking with the air-conditioning unit and the distance range between a location of the air-conditioning unit and locations of other air-conditioning units networking with the air-conditioning unit. For example, in a case where the number of other air-conditioning units networking with the air-conditioning unit is larger, or the distance range between a location of the air-conditioning unit and locations of other air-conditioning units networking with the air-conditioning unit is larger, the above predetermined distance is set to be larger; in a case where the number of other air-conditioning units networking with the air-conditioning unit is smaller, or the distance range between a location of the air-conditioning unit and locations of other air-conditioning units networking with the air-conditioning unit is smaller, the above predetermined distance may be set to be smaller.

In addition, in some implementations, the wireless network determined is controlled by a filtering condition to perform filtering. For example, a unique wireless network that is convenient for recognition by a user and within a certain recognition range is filtered out by setting the filtering condition. In such a processing manner, the networking speed of the air-conditioning unit will be accelerated to a certain extent.

Figure 2:
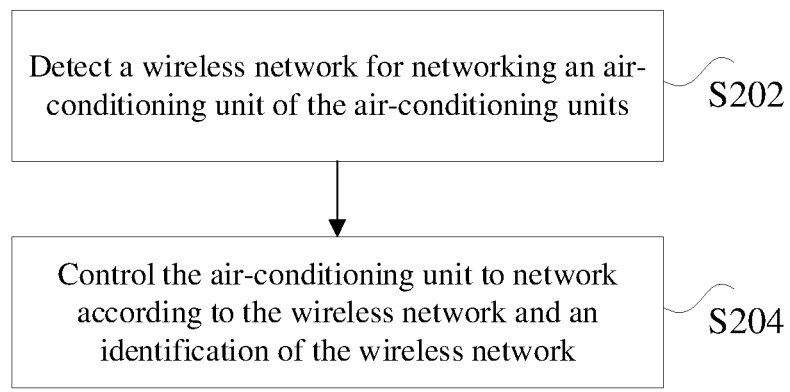
FIG. 2 is a flowchart showing a method for networking air-conditioning units according to embodiments of the present disclosure.

FIG. 2 is a flowchart showing a method for networking air-conditioning units according to embodiments of the present disclosure. As shown in FIG. 2, the method comprises the following steps.

At step S202, a wireless network for networking an air-conditioning unit of the air-conditioning units is detected.

At step S204, the air-conditioning unit is controlled to network according to the wireless network and the identification of the wireless network.

By the above steps, for the air-conditioning unit that is passively networked, the air-conditioning unit is networked by using a wireless network and the identification of the wireless network. The purpose of accurate communication between air-conditioner units is achieved, thereby realizing the technical effect of effectively avoiding communication between different air-conditioning unit systems and allowing a reliable communication between air-conditioning units within a same air-conditioning unit system. Thus, the technical problem of unreliable communication after wireless communication is used in the related art is further solved.

The identification in some implementations is a power-on password of another air-conditioning unit that triggers networking.

The air-conditioning unit is controlled to network according to the wireless network and the identification of the wireless network in a plurality of manners. For example, in a case where at least one wireless network is detected, the at least one wireless network detected is polled and prompted according to a predetermined time interval, a wireless network for networking is selected from the at least one wireless network that is polled and prompted, and the selected wireless network is joined according to the identification of the selected wireless network to control the air-conditioning unit to network. The predetermined time interval in some embodiments is determined according to the specific number of wireless networks. For example, when the number of wireless networks is larger, the time interval is set to be shorter, and when the number of wireless networks is smaller, the time interval is set to be longer.

In some embodiments, the step that the air-conditioning unit is controlled to network according to the wireless network and the identification of the wireless network comprises: the air-conditioning unit is controlled to connect to a networking device; and the air-conditioning unit is controlled to network by a wireless network identification input by the networking device and the identification of the wireless network. The wireless network identification is configured to identify a wireless network allowed by the air-conditioning unit to network with the air-conditioning unit. By the above processing, on one hand, independent networking is realized by the air-conditioning unit, or networking is realized by way of a networking device. By way of networking by a networking device, timely monitoring of the wireless network and labor cost are reduced on the one hand, and efficient automation on the other hand is achieved.

Figure 3:
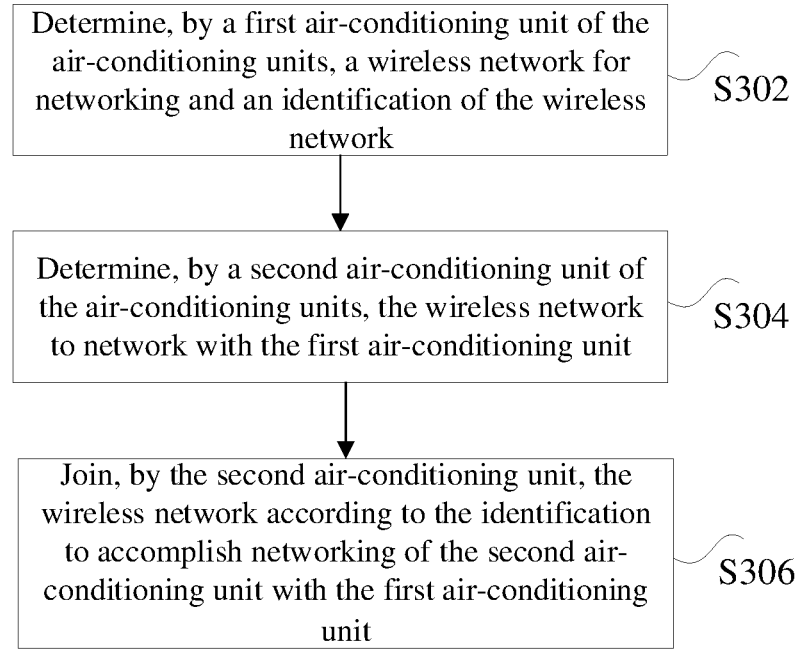
FIG. 3 is a flowchart showing a method for networking air-conditioning units according to embodiments of the present disclosure.

FIG. 3 is a flowchart showing a method for networking air-conditioning units according to embodiments of the present disclosure. As shown in FIG. 3, the method comprises the following steps.

At step S302, a wireless network for networking and the identification of the wireless network is determined by a first air-conditioning unit of the air-conditioning units.

At step S304, the wireless network to network with the first air-conditioning unit is determined by a second air-conditioning unit of the air-conditioning units.

At step S306, the wireless network is joined by the second air-conditioning unit according to the identification to accomplish networking of the second air-conditioning unit with the first air-conditioning unit.

By the above steps, in conjunction with a plurality of air-conditioning units to network, the air-conditioning units are networked by using a wireless network and the identification of the wireless network. The purpose of accurate communication between air-conditioner units is achieved, thereby realizing the technical effect of effectively avoiding communication between different air-conditioning unit systems and allowing a reliable communication between air-conditioning units within a same air-conditioning unit system. Thus, the technical problem of unreliable communication after wireless communication is used in the related art is further solved.

In some embodiments, the identification is a power-on password of the first air-conditioning unit.

In some embodiments, before the wireless network for networking is determined by the first air-conditioning unit, the method further comprise following steps: a power-on information of the first air-conditioning unit is read by a debugging device for debugging networking of the second air-conditioning unit with the first air-conditioning unit, the power-on information is converted into a power-on password by the debugging device, the power-on password is posted by the debugging device, the power-on password is received by the first air-conditioning unit, the received power-on password is compared with the power-on password stored by the first air-conditioning unit by the first air-conditioning unit to determine whether the received power-on password matches with the power-on password stored by the first air-conditioning unit, a networking state is entered by first air-conditioning unit with the power-on password as a network key in a case where whether the received power-on password matches with the power-on password stored by the first air-conditioning unit.

The step that the wireless network is joined by the second air-conditioning unit according to the identification to accomplish networking of the second air-conditioning unit with the first air-conditioning unit comprises: the second air-conditioning unit is connected to a networking device; and the wireless network is joined by the second air-conditioning unit by a wireless network identification input by the networking device and the identification of the wireless network to accomplish networking of the second air-conditioning unit with the first air-conditioning unit. The wireless network identification is configured to identify the wireless network of the first air-conditioning unit to network the second air-conditioning unit.

By the above embodiments, reliable communication between air-conditioning units in a same air-conditioning unit system (e.g., between indoor and outdoor units in a same refrigerant system of multi-split air conditioner) is implemented and a corresponding networking mechanism for a wireless communication network of air-conditioning units is established. The identification of the wireless communication network and the matching between air-conditioning units are realized in conjunction with the power-on password of an air-conditioning unit. A separate air-conditioning unit system is formed to achieve the reliability of wireless communication data.

In the following, in conjunction with some embodiments of the present disclosure, with a scenario in which the air-conditioning unit serves as an indoor or outdoor unit of the multi-split air conditioner, a method for identifying wireless communication networks of different multi-split air conditioner systems is provided. By a networking mechanism of wireless network in which an outdoor unit is joined by an indoor unit, a stable and reliable wireless communication networking is realized. The embodiments of the present disclosure will be described below in conjunction with the accompanying drawings.

Figure 4:
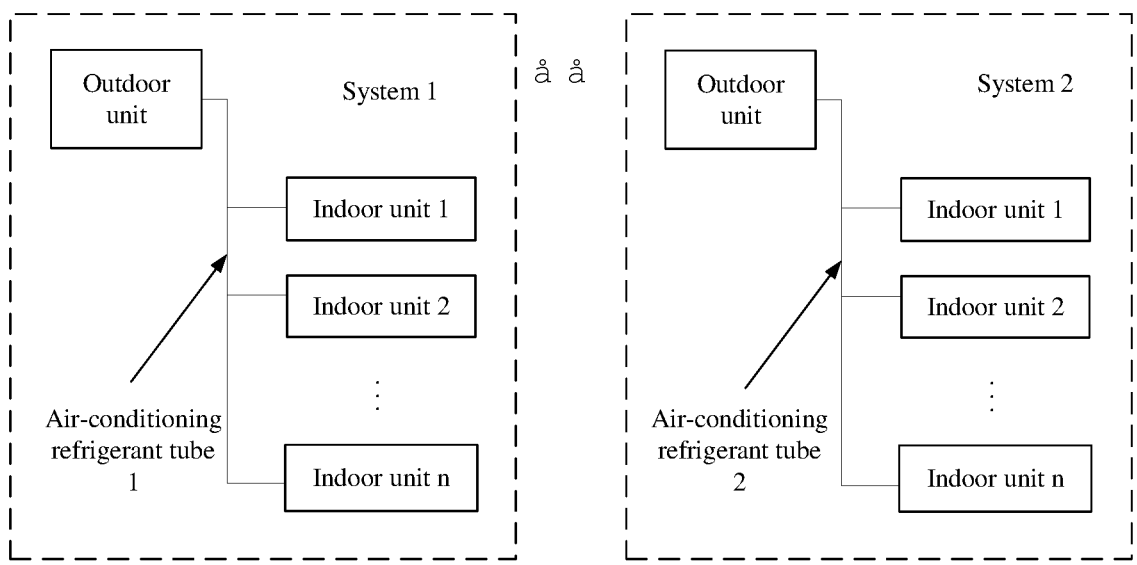
FIG. 4 is a schematic view showing a wireless communication network architecture of a multi-split air conditioner system according to some implementations of the present disclosure.

FIG. 4 is a schematic view showing a wireless communication network architecture of a multi-split air conditioner system according to some implementations of the present disclosure. As shown in FIG. 4, each air-conditioning system has a separate air-conditioning refrigerant copper tube to connect the outdoor unit and the indoor units, for example, the outdoor unit in the system 1 is connected to the corresponding indoor units 1, 2 . . . n through the air-conditioning refrigerant copper tube 1, and the outdoor unit in the system 2 is connected to the corresponding indoor units 1, 2 . . . n through the air-conditioning refrigerant copper tube 2. In this way, the outdoor unit and the corresponding indoor units form a unique communication network to ensure the reliability of the system.

Based on the above wireless communication network architecture of multi-split air conditioner system, in some embodiments of the present disclosure, a wireless communication networking method of a multi-split air conditioner system is also provided. In this method, the network IDs of different refrigerant systems are maintained based on the power-on password of the unit, and the networking of an outdoor unit with a corresponding indoor unit within the multi-split air conditioner system is implemented based on different network IDs, thereby achieving a reliable maintenance of the network.

Figure 5:
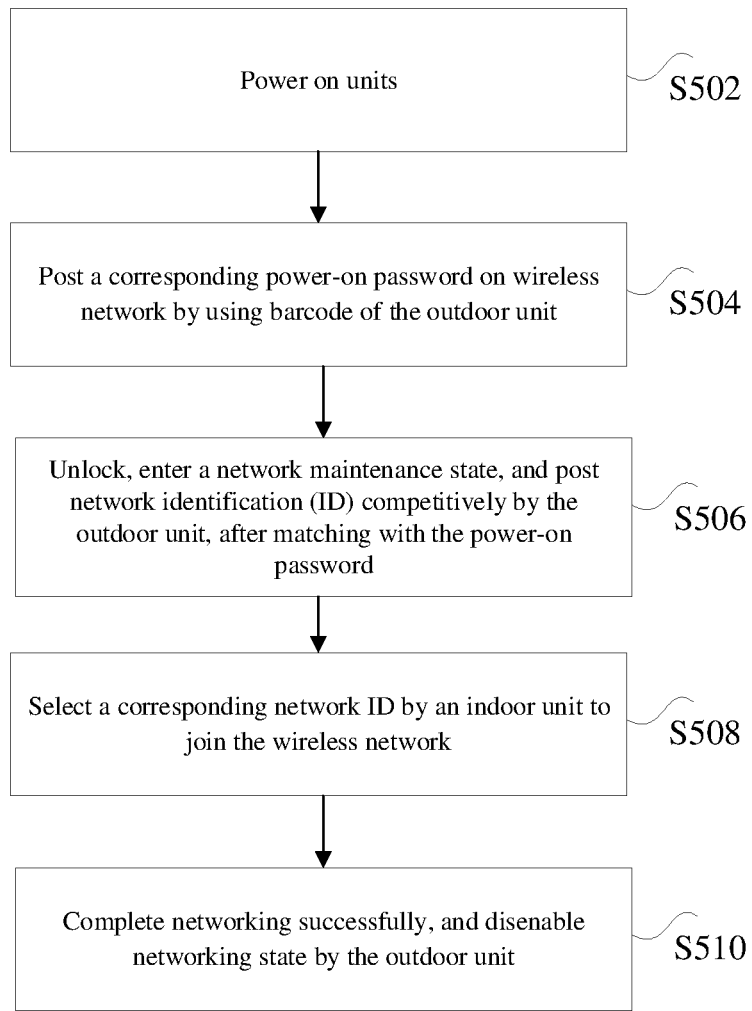
FIG. 5 is a flowchart showing a wireless communication networking method for a multi-split air conditioner system according to some implementations of the present disclosure.

FIG. 5 is a flowchart showing a wireless communication networking method for a multi-split air conditioner system according to some implementations of the present disclosure. As shown in FIG. 5, the method comprises the following steps.

At step S502, units are powered on.

At step S504, a corresponding power-on password is posted on wireless network by using barcode of the outdoor unit.

At step S506, the outdoor unit is unlocked, enters a network maintenance state and posts network identification (ID) competitively after matching with the power-on password.

At step S508, a corresponding network ID is selected by an indoor unit to join the wireless network.

At step S510, networking is completed successfully, and networking state is disenabled by the outdoor unit.

Specifically, the networking method of a multi-split air conditioner wireless communication network based on the power-on password of unit comprises the following processing.

1. The outdoor unit establishes a unique wireless communication network.

1) After the outdoor unit is powered on, a corresponding power-on password is obtained by a dedicated debugging device using a barcode of the outdoor unit based on pre-agreed conversion rule, and the power-on password of an outdoor unit required to be networked through wireless communication network is posted by the dedicated debugging device. Each outdoor unit has a separate barcode.

2) On the basis that the wireless communication network is interconnected, all the devices that are powered on can receive the power-on password on the wireless communication network. At this time, after receiving the power-on password posted by the dedicated debugging device, the outdoor unit reads the barcode memorized in the outdoor unit, obtains a corresponding power-on password by pre-agreed conversion rule, and compares the corresponding power-on password with the power-on password received on the wireless communication network. If a matched comparison result is obtained, the outdoor unit is considered to network. The outdoor unlocks using the power-on password and enters a networking state with the power-on password as a network key. At the same time, the outdoor detects wireless network IDs present nearby, and forms a unique network ID that is convenient for recognition by a user and within a certain recognition range in a competitive filtering manner.

2. The indoor unit joins the network of the outdoor unit to accomplish networking of the refrigerant system.

The indoor unit joins the outdoor unit in the following two manners.

1) Manner I: the indoor unit after being powered-on receives wireless network ID of the outdoor unit present nearby. If there is only one network ID of the outdoor unit, the ID number will be will directly displayed or a corresponding prompt is made. If there are a plurality of wireless network IDs of the outdoor unit at the same time, the received IDs are polled and prompted sequentially with a polling interval of T seconds which is set as required. If the outdoor unit corresponding to the currently prompted network ID is determined to be required to be joined, confirmation is made by a specific input or a specific operation at this time, so that the networking is accomplished, and joining of the network for all the indoor units is accomplished sequentially.

2) Manner II: the indoor unit after being powered-on enters a networking standby state. At this time, a network device is connected, and a corresponding wireless network ID of the outdoor unit is input by the network device, thereby the networking is accomplished, and joining of the network for all the indoor units is accomplished sequentially.

3. After all the indoor units join the network, the networking of the corresponding refrigerant system is accomplished, and the outdoor unit disenables the networking state. Thus, the networking of a wireless communication network of an outdoor unit and a corresponding indoor unit in one refrigerant system is established and the reliability of data transmission is ensured.

By the above automatic matching manner, the wireless communication network of each refrigerant system is established to provide network uniqueness for networking. Based on the network uniqueness, effective and reliable networking of an outdoor unit and corresponding indoor units in a same refrigerant system is implemented.

Figure 6:
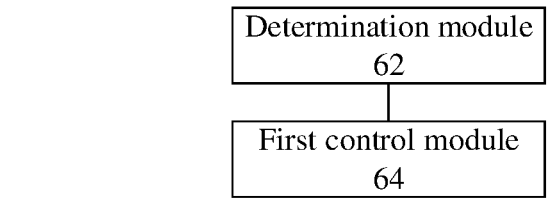
FIG. 6 is a structural block view showing a device for networking air-conditioning units according to embodiments of the present disclosure.

In the embodiments of the present disclosure, a device for networking air-conditioning units is also provided. FIG. 6 is a structural block view showing a device for networking air-conditioning units according to embodiments of the present disclosure. As shown in FIG. 6, the device comprises a determination module 62 and a first control module 64. The device will be described below.

The determination module 62 is configured to determine a wireless network for networking the air-conditioning unit and an identification of the wireless network. The first control module 64 is connected to the above determination module 62 and configured to control the air-conditioning unit to network according to the wireless network and the identification.

In some embodiments, the device further comprises a receiving module and an entry module. The receiving module is configured to receive a networking trigger information sent from the debugging device. The debugging device is configured to debug networking of the air-conditioning unit, and the networking trigger information is configured to trigger the air-conditioning unit to enter a networking state. The entry module is connected to the above receiving module and the determination module 62 and configured to enter the networking state according to the networking trigger information.

In some embodiments, the above receiving module comprises a receiving unit configured to receive the networking trigger information sent from the debugging device, the networking trigger information comprising a power-on password for unlocking the air-conditioning unit sent from the debugging device. The above entry module comprises a comparison unit and entry unit in some embodiments. The comparison unit is configured to compare the power-on password sent from the debugging device with the power-on password stored by the air-conditioning unit to determine whether the power-on password sent from the debugging device matches with the power-on password stored by the air-conditioning unit. The entry unit is configured to enter the networking state with the power-on password as a network password in a case where whether the power-on password sent from the debugging device matches with the power-on password stored by the air-conditioning unit to obtain a comparison result.

In some embodiments, at least one of the power-on password sent from the debugging device and/or the power-on password stored by the air-conditioning unit is obtained by reading the power-on information of the air-conditioning unit stored in at least one of a barcode or a two-dimensional code.

In some embodiments, the above determination module 62 further comprises an obtaining unit and a filtering unit. The obtaining unit is configured to acquire at least one wireless network within a predetermined distance of the air-conditioning unit. The filtering unit is configured to filter at least one wireless network to obtain a unique wireless network within a predetermined range as the wireless network for networking the air-conditioning unit.

Figure 7:
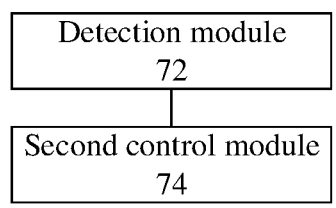
FIG. 7 is a structural block view showing a device for networking air-conditioning units according to embodiments of the present disclosure.

In embodiments of the present disclosure, a device for networking air-conditioning units is also provided. FIG. 7 is a structural block view showing a device for networking air-conditioning units according to embodiments of the present disclosure. As shown in FIG. 7, the device comprises a detection module 72 and a second control module 74. The device will be described below.

The detection module 72 is configured to detect a wireless network for networking the air-conditioning unit. The second control module 74 is connected to the above detection module 72 and configured to control the air-conditioning unit to network according to the wireless network and an identification of the wireless network.

In some embodiments, the second control module 74 further comprises a polling unit and a selection unit. The polling unit is configured to poll and prompt at least one wireless network detected according to a predetermined time interval. The selection unit is configured to select a wireless network for networking from the at least one wireless network that is polled and prompted and join the wireless network according to the identification of the selected wireless network to control the air-conditioning unit to network.

In some embodiments, the above second control module 74 further comprises a first control unit and a second control unit. The first control unit is configured to control the air-conditioning unit to connect to a networking device. The second control unit is configured to control the air-conditioning unit to network by the wireless network identification input by the networking device and the identification of the wireless network. The wireless network identification is configured to identify a wireless network allowed by the air-conditioning unit to network with the air-conditioning unit.

Figure 8:
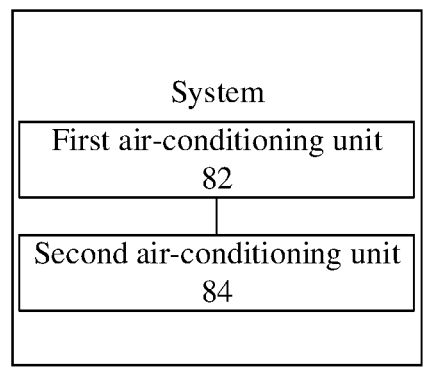
FIG. 8 is a structural block view showing a system for networking air-conditioning units according to embodiments of the present disclosure.

In embodiments of the present disclosure, a system for networking air-conditioning units is also provided. FIG. 8 is a structural block view showing a system for networking air-conditioning units according to embodiments of the present disclosure. As shown in FIG. 8, the system comprises a first air-conditioning unit 82 and a second air-conditioning unit 84. The system will be described below.

The first air-conditioning unit 82 is configured to determine a wireless network for networking and an identification of the wireless network. The second air-conditioning unit 84 is in communication with the first air-conditioning unit 82 and configured to the wireless network to network with the first air-conditioning unit and join the wireless network according to the identification to accomplish networking of the second air-conditioning unit with the first air-conditioning unit.

In some embodiments, the system further comprises a debugging device configured to debug networking of the second air-conditioning unit with the first air-conditioning unit. The debugging device is configured to read a power-on information of the first air-conditioning unit, convert the power-on information into a power-on password and post the power-on password. The first air-conditioning unit 82 is further configured to receive the power-on password, compare the power-on password sent from the debugging device with the power-on password stored by the air-conditioning unit to determine whether the power-on password sent from the debugging device matches with the power-on password stored by the air-conditioning unit, and enter a networking state with the power-on password as a network key in a case where the power-on password sent from the debugging device matches with the power-on password stored by the air-conditioning unit.

In some embodiments, the second air-conditioning unit 84 is further configured to connect to a networking device, join the wireless network according to the identification to accomplish networking of the second air-conditioning unit with the first air-conditioning unit. The wireless network identification is configured to identify the wireless network of the first air-conditioning unit to network with the second air-conditioning unit.

In embodiments of the present disclosure, a storage medium is also provided. The storage medium comprises a program stored. A device where the storage medium is located is controlled to execute the method for networking air-conditioning units according to any one of the above embodiments.

In embodiments of the present disclosure, a processor is further provided. The processor is configured to run a program. The method for networking air-conditioning units according to any one of the above embodiments is executed when the program is run.

The serial numbers of the above embodiments of the present disclosure which are for description only, do not represent the advantages and disadvantages of the embodiments.

In the above embodiments of the present disclosure, the description of each embodiment has its own emphasis. For a part that is not detailed in an embodiment, reference may be made to the related description of other embodiments.

In the several embodiments provided in the present disclosure, it should be understood that the disclosed technical content is implemented in other manners in some embodiments. The embodiments of the device described above are only schematic. For example, the division of units is a logical function division. In actual implementation, there are other divisions. For example, a plurality of units or assemblies are combined or integrated into another system, or some features are ignored, or not implemented. In addition, the mutual coupling or direct coupling or communication connection showed or discussed is indirect coupling or communication connection through some interfaces, units or modules, and is in electrical or other forms.

The units described as separate components is or is not physically separated, and the components shown as units is or is not physical units, that is, they are located at one place, or are distributed over a plurality of units. Some or all the units are selected to achieve the purpose of the solution of the present embodiment according to actual needs.

In addition, in some embodiments each functional unit in each embodiment of the present disclosure is integrated into one processing unit. In some embodiments, each unit exists alone physically, or two or more units are integrated into one unit. The integrated unit described above is implemented in the form of a hardware or a software functional unit.

If implemented in the form of a software functional unit and sold or used as an independent product, the integrated unit is stored in a computer-readable storage medium. Based on such understanding, the technical solution of the present disclosure essentially or a part contributing to the art known to the inventors or an entirety or apart of the technical solution is embodied in the form of a software product. The computer software product which is stored in a storage medium comprises several instructions to enable a computer device (which is a personal computer, a server, or network device, or the like) to perform all or some of the steps of the methods described in various embodiments of the present disclosure. The aforementioned storage medium comprises any medium that stores program codes, such as U disk, read-only memory (ROM), random access memory (RAM), mobile hard disk, magnetic disk or optical disk.

The above description is only some embodiments of the present disclosure. It should be noted that several improvements and refinements made by those skilled in the art without departing from the principles of the present disclosure are also considered to be within the protection scope of the present disclosure.

What is claimed is:

1. A method for networking air-conditioning units, comprising:
   determining a wireless network for networking an air-conditioning unit of the air-conditioning units and an identification of the wireless network, wherein the identification is a power-on password stored by the air-conditioning unit; and
   controlling the air-conditioning unit to network according to the wireless network and the identification;
   wherein before determining the wireless network for networking the air-conditioning unit, the method further comprises:
   receiving a networking trigger information for triggering the air-conditioning unit to enter a networking state, wherein the networking trigger information comprises a power-on password for unlocking the air-conditioning unit, and the networking trigger information is sent from a debugging device configured to debug networking of the air-conditioning unit; and
   entering the networking state according to the networking trigger information, comprising:
   comparing the power-on password sent from the debugging device with the power-on password stored by the air-conditioning unit to determine whether the power-on password sent from the debugging device matches with the power-on password stored by the air-conditioning unit, and
   entering the networking state with the power-on password as a network key, in a case where the power-on password sent from the debugging device matches with the power-on password stored by the air-conditioning unit.

2. The method according to claim 1, wherein at least one of the power-on password sent from the debugging device or the power-on password stored by the air-conditioning unit is obtained by reading a power-on information of the air-conditioning unit, wherein the power-on information is stored in at least one of a bar code or a two-dimensional code.

3. The method according to claim 1, wherein the determining the wireless network for networking the air-conditioning unit comprises:
   obtaining at least one wireless network within a predetermined distance of the air-conditioning unit; and
   filtering the at least one wireless network to obtain a unique wireless network within a predetermined range as the wireless network for networking the air-conditioning unit.

4. A non-transitory storage medium comprising a program stored, wherein the program is configured to control a device where the non-transitory storage medium is located to execute the method for networking air-conditioning units according to claim 1 when being run.

5. A processor configured to run a program to execute the method for networking air-conditioning units according to claim 1.

6. A system for networking air-conditioning units, comprising:
   a first air-conditioning unit comprising the processor according to claim 5, wherein the air-conditioning unit is the first air-conditioning unit; and
   a second air-conditioning unit is configured to determine the wireless network to network with the first air-conditioning unit and join the wireless network according to the identification to accomplish networking of the second air-conditioning unit with the first air-conditioning unit.

7. The method according to claim 1, wherein the air-conditioning unit is an outdoor unit.

8. A non-transitory storage medium comprising a program stored, wherein the program is configured to control a device where the non-transitory storage medium is located to execute the method for networking air-conditioning units according to claim 7 when being run.

9. A processor configured to run a program to execute the method for networking air-conditioning units according to claim 7.

10. A method for networking air-conditioning units, comprising:
    detecting a wireless network for networking an air-conditioning unit of the air-conditioning units; and
    controlling the air-conditioning unit to network according to the wireless network and an identification of the wireless network, wherein the identification is a power-on password stored by another air-conditioning unit that triggers networking,
    wherein the another air-conditioning unit receives a networking trigger information for triggering the air-conditioning unit to enter a networking state, wherein the networking trigger information comprises a power-on password for unlocking the another air-conditioning unit, and the networking trigger information is sent from a debugging device configured to debug networking of the another air-conditioning unit;
    compares the power-on password sent from the debugging device with the power-on password stored by the another air-conditioning unit to determine whether the power-on password sent from the debugging device matches with the power-on password stored by the air-conditioning unit; and
    enters a networking state with the power-on password as a network key, in a case where the power-on password sent from the debugging device matches with the power-on password stored by the another air-conditioning unit.

11. The method according to claim 10, wherein the controlling the air-conditioning unit to network according to the wireless network and the identification of the wireless network comprises:
    polling and prompting at least one wireless network according to a predetermined time interval, in a case where the wireless network comprises the at least one wireless network;
    selecting a wireless network for networking from the at least one wireless network; and
    joining the selected wireless network according to the identification of the selected wireless network to control the air-conditioning unit to network.

12. The method according to claim 10, wherein the controlling the air-conditioning unit to network according to the wireless network and the identification of the wireless network comprises:
    controlling the air-conditioning unit to connect to a networking device; and controlling the air-conditioning unit to network by a wireless network identification input by the networking device and the identification of the wireless network, wherein the wireless network identification is configured to identify the wireless network allowed by the air-conditioning unit to network with the air-conditioning unit.

13. A processor configured to run a program to execute the method for networking air-conditioning units according to claim 10.

14. A system for networking air-conditioning units, comprising:
a first air-conditioning unit configured to determine a wireless network for networking and an identification of the wireless network; and
a second air-conditioning unit comprising the processor according to claim 13, wherein the air-conditioning unit is the second air-conditioning unit.

15. A non-transitory storage medium comprising a program stored, wherein the program is configured to control a device where the non-transitory storage medium is located to execute the method for networking air-conditioning units according to claim 10 when being run.

16. The method according to claim 10, wherein the air-conditioning unit is an indoor unit, and the another air-conditioning unit is an outdoor unit.

17. A non-transitory storage medium comprising a program stored, wherein the program is configured to control a device where the non-transitory storage medium is located to execute the method for networking air-conditioning units according to claim 16 when being run.

18. A method for networking air-conditioning units, comprising:
determining, by a first air-conditioning unit of the air-conditioning units, a wireless network for networking and an identification of the wireless network, wherein the identification is a power-on password stored by the first air-conditioning unit;
determining, by a second air-conditioning unit of the air-conditioning units, the wireless network to network with the first air-conditioning unit; and
joining, by the second air-conditioning unit, the wireless network according to the identification to accomplish networking of the second air-conditioning unit with the first air-conditioning unit;
wherein before determining the wireless network for networking by the first air-conditioning unit, the method further comprises:
reading a power-on information of the first air-conditioning unit, converting the power-on information into a power-on password and posting the power-on password, by a debugging device for debugging networking of the second air-conditioning unit with the first air-conditioning unit;
receiving the power-on password, comparing the received power-on password with the power-on password stored by the first air-conditioning unit to determine whether the received power-on password matches with the power-on password stored by the first air-conditioning unit, and entering a networking state with the power-on password as a network key in a case where the received power-on password matches with the power-on password stored by the first air-conditioning unit.

19. The method according to claim 18, wherein the joining, by the second air-conditioning unit, the wireless network according to the identification to accomplish networking of the second air-conditioning unit with the first air-conditioning unit comprises:
connecting, by the second air-conditioning unit, a networking device; and
joining, by the second air-conditioning unit, the wireless network by a wireless network identification input by the networking device and the identification of the wireless network to accomplish networking of the second air-conditioning unit with the first air-conditioning unit, wherein the wireless network identification is configured to identify the wireless network of the first air-conditioning unit to network the second air-conditioning unit.

20. The method according to claim 18, wherein the first air-conditioning unit is an outdoor unit, and the second air-conditioning unit is an indoor unit.

* * * * *